(12) United States Patent
Symons

(10) Patent No.: US 6,337,107 B1
(45) Date of Patent: Jan. 8, 2002

(54) METHOD OF PREPARING EXFOLIATED VERMICULITE FOR THE MANUFACTURE OF A FINISHED PRODUCT

(75) Inventor: Michael Windsor Symons, Pretoria (ZA)

(73) Assignee: Windsor Technologies Limited, Nassau (BS)

(*) Notice: Subject to any disclaimer, the term of this patent is extended or adjusted under 35 U.S.C. 154(b) by 0 days.

(21) Appl. No.: 09/445,822

(22) PCT Filed: Jun. 12, 1998

(86) PCT No.: PCT/GB98/01712

§ 371 Date: Dec. 10, 1999

§ 102(e) Date: Dec. 10, 1999

(87) PCT Pub. No.: WO98/56729

PCT Pub. Date: Dec. 17, 1998

(30) Foreign Application Priority Data

Jun. 12, 1997 (ZA) ............................................. 97/5200
Jul. 16, 1997 (ZA) ............................................. 97/6291
Mar. 30, 1998 (ZA) ............................................. 97/2638

(51) Int. Cl.[7] ............................. B05D 3/02; C08K 3/22; C08K 3/34
(52) U.S. Cl. ............................... 427/383.3; 427/327.2; 427/385.5; 524/780; 524/785; 524/786
(58) Field of Search .................................. 524/780, 785, 524/786; 427/327.2, 383.3, 385.5

(56) References Cited

U.S. PATENT DOCUMENTS

| 3,364,168 A | 1/1968 | Gessler .......................... 524/471 |
| 4,147,687 A | 4/1979 | O'Donnell .................... 524/65 |

FOREIGN PATENT DOCUMENTS

| AT | 356 568 | 5/1980 |
| DE | 2 263 236 | 6/1974 |
| FR | 2 671 115 | 7/1992 |
| WO | 96 13468 | 5/1996 |
| WO | 97 49532 | 12/1997 |

OTHER PUBLICATIONS

Database WPI, Week 8110 Derwent Publications Ltd. AN 81–165630, XP002078054 & JP 56 000871 A.

*Primary Examiner*—Peter Szekely
(74) *Attorney, Agent, or Firm*—Pillsbury Winthrop LLP

(57) ABSTRACT

A method of manufacturing a finished product from exfoliated vermiculite particles includes the steps of impregnating the exfoliated vermiculite particles with an impregnating composition consisting of a mineral oil and a liquid thermosetting resin, optionally with a catalyst therefor. Thereafter, the exfoliated vermiculite particles are compressed with heating to allow the mineral oil to infuse the exfoliated vermiculite particles and polymerize the thermosetting resin to form the finished product.

16 Claims, No Drawings

METHOD OF PREPARING EXFOLIATED VERMICULITE FOR THE MANUFACTURE OF A FINISHED PRODUCT

BACKGROUND OF THE INVENTION

This application is the national phase of international application PCT/GB98/01712 filed Jun. 12, 1998 which designated the U.S.

This invention relates to a method for preparing exfoliated vermiculite particles for the manufacture of a finished product.

It is known to manufacture composite board products from exfoliated vermiculite particles. It is also known from WO 96/13468 to impregnate vermiculite with an impregnating composition comprising inter alia an isocyanate thermosetting resin, or to treat vermiculite particles with a dry powder novolac thermosetting resin.

There is a requirement that these products be highly water resistant.

SUMMARY OF THE INVENTION

According to a first aspect of the invention there is provided a method of manufacturing a finished product from exfoliated vermiculite particles which method includes the steps of:

(a) impregnating the exfoliated vermiculite particles with an impregnating composition comprising;
  (i) a mineral oil; and
  (ii) a liquid thermosetting resin and, if necessary, a catalyst therefor;
  in the form of a dispersion of the liquid resin in the mineral oil; and (b) compressing the exfoliated vermiculite particles with heating to allow the mineral oil to infuse the exfoliated vermiculite particles and to polymerise the thermosetting resin to form the finished product.

The method of the invention preferably includes a further step, step (c):

(c) before step (a) or preferably before step (b) applying to the exfoliated vermiculite particles a thermosetting resin in finely divided dry powder form and, if necessary, a catalyst therefor, so that the thermosetting resin in finely divided dry powder form adheres to the surfaces of the exfoliated vermiculite particles.

It is to be noted that the impregnating composition does not contain a solvent, which gives the method certain advantages, including the fact that there is no need to remove a solvent before step (b) can be carried out.

The thermosetting resin used in step (a) must be a liquid thermosetting resin so that it can infuse the exfoliated vermiculite particles and so that a dispersion of the resin in the mineral oil is formed.

The thermosetting resin used in step (a) is preferably an isocyanate thermosetting resin or a precursor thereof, more preferably a resin derived from diphenylmethane-4,4'-diisocyanate (MDI).

The thermosetting resin in finely divided dry powder form used in step (c) is preferably a novolac resin, based upon phenol and formaldehyde.

The liquid thermosetting resin used in step (a) is preferably used in an amount of from 1% to 20% inclusive by mass of the mass of the dry exfoliated vermiculite particles, preferably from 2% to 10% inclusive by mass of the mass of the dry exfoliated vermiculite particles.

The mineral oil is preferably used in an amount of from 5% to 30% inclusive by mass of the mass of the dry exfoliated vermiculite particles, more preferably in an amount of from 10% to 20% by mass of the mass of the dry exfoliated vermiculite particles.

The thermosetting resin in finely divided dry powder form used in step (c) may be used in an amount of from 0% to 20% inclusive by mass of the mass of the dry exfoliated vermiculite particles, preferably in an amount of from 3% to 10% inclusive by mass of the mass of the dry exfoliated vermiculite particles.

In step (a) the exfoliated vermiculite particles may be impregnated with the impregnating composition in any suitable manner, for example by spraying or coating the impregnating composition onto the exfoliated vermiculite particles, or by mixing the impregnating composition with the exfoliated vermiculite particles in conventional mixing equipment.

In step (b), the impregnated exfoliated vermiculite particles may be compressed and heated in a suitable press or mould at temperatures between 120° C. and 250° C. inclusive preferably up to 220° C. and pressures of from 2 to 70 kg/cm$^2$ inclusive preferably from 10 to 60 kg/cm$^2$ inclusive for a time from 5 seconds to 20 seconds inclusive per mm of thickness, to allow the mineral oil to infuse the exfoliated vermiculite particles and to polymerise the thermosetting resin or resins present.

There may be added to the exfoliated vermiculite particles, an amount of organic or morganic fibres, preferably ceramic glass or carbon fibres, or synthetic, e.g polypropylene, polyethylene, acrylonitrile, or polyester fibres, or natural fibres, e.g sisal, kenaf, hemp, or flax fibres to provide improved internal bonding, and, where necessary, improved screw holding capability. The amount of fibres so added may be up to 7.5% by mass of the mass of exfoliated vermiculite particles.

According to a second aspect of the invention there is provided a method of preparing exfoliated vermiculite particles for the manufacture of a finished product, which method includes the step of:

(a) impregnating the exfoliated vermiculite particles with an impregnating composition comprising:
  (i) a mineral oil; and
  (ii) a liquid thermosetting resin and, if necessary, a catalyst therefor;
  in the form of a dispersion of the liquid resin in the mineral oil.

The method may include a further step, step (c), before or after step (a):

(b) before or after step (a) applying to exfoliated vermiculite particles a thermosetting resin in finely divided dry power form and, if necessary, a catalyst therefor so that the thermosetting resin in finely divided dry powder form adheres to the surfaces of the exfoliated vermiculite particles.

DESCRIPTION OF EMBODIMENTS

The crux of the invention is a method of manufacturing a finished product from exfoliated vermiculite particles.

Vermiculite used in the method of the invention is a geological name given to a group of hydrated lamina industrial minerals which are aluminium from magnesium silicates resembling mica in appearance. Vermiculite has the unusual attribute that when subjected to temperatures of the order of 750° C., vermiculite exfoliates or expands in volume as a result of the moving apart of the laminae due to the interlaminae generation of steam, which is due to the release of crystalline water of hydration at these elevated temperatures.

Vermiculite is inert, is chemically pure, non carcinogenic, does not contain asbestos, lends itself admirably to through impregnation by the impregnating composition described, has the unusual attribute of being able to be dyed at very low dye concentrations, or to being pigmented, and is subsequently compressible during press forming operations from a bulk density of from 50 to 150 g per litre up to a final density of from 600 g to 1,6 kg per litre. Vermiculite is non corrosive, non combustible, non allergenic, is odourless and harmless, is proof to attack by micro organisms, and does not swell when water wetted.

After forming according to the method of the invention, the product containing vermiculite may be cut, drilled or worked with ease.

Vermiculite has a thermal conductivity of from 0,6 to 0,068 W/M° C. It has a specific gravity of 2,6 a melting point of 1315° C. and a sintering temperature of 1260° C.

Typical screen analysis of the particle sizes suitable for the method of the invention are the large grade in which 90 to 89% of the mass is retained on a 2800 micron screen, to medium grade of screen analysis of 50 to 70% retained on a 1000 micron screen, 20 to 35% retained on a 710 micron screen, through different size grades down to the micron grade in which 90% passes a 500micron screen.

The crux of the invention is thus that the exfoliated vermiculite particles are impregnated with an impregnating composition which must comprise a mineral oil, and a liquid thermosetting resin dispersed therein.

The oil must be a mineral oil, preferably a low viscosity paraffinic or naphthenic mineral oil which is inert.

Examples of suitable mineral oils are:

Waksol - $F_1$ provided by the Carbo-Tar Division of Sasol Chemical Industries Limited of South Africa, which is a coal derived mineral oil of flash point of 107,5° C., a water content of 0,05% and a wax content of between 10 and 15% of a wax dissolved in the oil at elevated temperatures, the wax having a pour point of 30 to 40° C. The density of this oil is 0,9 g/cm$^3$.

Parprol 22 of Engen (Mobil Chemicals) of South Africa being a low viscosity honey coloured petroleum derived paraffinic process oil, with or without wax inclusion. Parprol 22 has a density of 0,859 g/cm$^3$, viscosity in cSt at 40° C. of 20,6 (1cSt=1×10$^{-6}$m$^{2/S}$), carbon type analysis and percentages -aromatics 3, naphthenics 28, and paraffinics 69, a neutralization number mgKOH/g of 0,01, and a flash point of 196° C.

Shell Base Oil code MVI (P1300) with a polycyclic aromatic content of 2,9%, a sulphur percentage of 2%, a total acid number of 0,1 mg KOH/g.

Further examples are Quendilla 19, a process oil, or Transcal N, which is a low viscosity heat transfer oil, both by British Petroleum.

In general, it is the paraffinic oils as against the naphthenic oils that are preferred on grounds of cost. The mineral oils in the context of the invention are process oils for the purpose of water proofing the exfoliated vermiculite particles and they are inert and do not cross link with the thermosetting resins, i.e isocyanate or novolac resins that may be used, there being no available hydroxyl or other reactive groups in their chemical make up.

The impregnating composition must also include a liquid thermosetting resin, and, if necessary, a catalyst therefor.

The thermosetting resin is preferably an isocyanate thermosetting resin.

Isocyanates are compounds containing the group—N=C=O and are characterised by the general formula:

$R(NCO)_x$ wherein x is variable and denotes the number of NCO groups, and R denotes a suitable group.

Examples of organic isocyanates include aromatic isocyanates such as m- and p-phenylenediisocyanate, toluene-2,4- and 2,6-diisocyanates, diphenylmethane-4,4'diisocyanate, diphenylmethane-2,4-diisocyanate, chlorophenylene-2,4-diisocyanate, diphenylene-4,4'-diisocyanate, 4,4'diisocyanate-3,3'dimethyldiphenyl, 3-methyldiphenylmethane-4,4'-diisocyanate and diphenyletherdiisocyanate, 2,4,6-triisocyanatotoluene and 2,4,4'-triisocyanatodiphenylether. There may be present mixtures of isocyanates for example a mixture of toluene diisocyanate isomers such as the commercially available mixtures of 2,4- and 2,6-isomers and also the mixtures of di and higher polyisocyanates produced by phosgenation of aniline/formaldehyde condensates. Such mixtures are well known in the art and include the crude phosgenation products containing mixtures of methylene bridges polyphenylpolyisocyanates including diisocyanate, triisocyanate and higher polyisocyanates together with any phosgenation by-products.

Preferred compositions are those wherein the isocyanate is an aromatic diisocyanate or polyisocyanate of higher functionality, in particular crude mixtures of methylene bridged polyphenylpolyisocyanates containing diisocyanate, triisocyanate and higher functionality polyisocyanates. The methylene bridge polyphenylpolyisocyanates are well known in the art and are sometimes referred to as polymeric methylene bridged polyphenyldiisocyanate (MDI) having an isocyanate functionality ranging from 2,5-3 and other products sometimes referred to as crude MDI having higher functionality. They are prepared by phosgenation of corresponding mixtures of polyamines obtained by condensation of aniline and formaldehyde.

Specific example of suitable isocyanates are those having an (NCO) content percentage preferably exceeding 20%, more preferably exceeding 25%. These isocyanates promote latency or reduced reactivity because of the high number of NCO groups, and provide the maximum capacity for hydroxyl bonding. Examples are Desmadur VKS or Desmadur VK by Bayer, which are solvent free mixtures of aromatic polyisocyanates such as diphenyl methane-4,4 diisocyanate and polymeric matter. These and similar are among those referred to as MDIs in the industry. A further description used is a diisocyanate-diphenylmethane, further examples being Suprasec DNR-5005, which is a polymeric MDI, or Suprasec 2020 which is a monomeric MDI with available NCO percentages of 30,7% and 29% and which are polymeric MDI with standard functionality and monomeric MDI respectively. The Suprasec resins are supplied by ICI. A further example of a crude MDI is Voronate M 229 by Dow Chemical Company.

Further suitable diisocyanates are the toluene diisocyanates with the alternative names tolylene diisocyanate or toluylene diisocyanate with the abbreviation TDI, such as Desmadur L75 by Bayer.

It is to be noted that the term "isocyanate thermosetting resin" is intended to include the resins per se, as well as those components which may be regarded as precursors of the resins, such as MDIs and TDIs.

Other examples of suitable thermosetting resins are as follows:

Epoxy resins such as the Epikote series by Shell Chemicals or Araldite PY 340.2 by Ciba-Geigy, with latent heat triggered catalysts in the range of 80° C. such as the boron trifluorides by Anchor Chemicals or aromatic polyamines such as Ancamine SRX.

Methyl methacrylates, acrylics of methacrylic acid esters, with appropriate catalysts.

The liquid thermosetting resin is preferably used in an amount of from 1% to 20% inclusive, more preferably from 2% to 10% inclusive by mass of the mass of the dry exfoliated vermiculite particles.

The mineral oil is preferably used in an amount of from 5% to 30% inclusive, more preferably in an amount of from 10% to 20% inclusive by mass of the mass of the dry exfoliated vermiculite particles.

The method of the invention preferably includes step (c), before step (a) or step (b), of applying to the exfoliated vermiculite particles a thermosetting resin in finely divided dry powder form, and, if necessary, a catalyst therefor so that the thermosetting resin adheres to the surface of the exfoliated vermiculite particles.

The thermosetting resin is preferably a novolac resin, based upon phenol and formaldehyde, such as a resin where the molar ratio of phenol to formaldehyde exceeds parity, or one modified with cashew nut oil extracts or used in conjunction with cashew nut oil long chain alkyl prepolymers, and which may contain a catalyst such as hexamethylene terramine. These products, on decomposition with heat, give rise to a source of formaldehyde inducing the condensation of the polymer to form a three dimensional stable network with minimal shrinkage, and which is hard, strong and water insoluble.

Examples of suitable novolac resins are those of BP Chemicals Code CHI13; a cashew nut prepolymer also from BP Chemicals J3100L; or Schennectady SA 891 or PRP 3337 by Polyresin Products of South Africa, which are long flow novolac resins.

The thermosetting resin in finely divided dry powder form is preferably used in an amount of from 0% to 20% inclusive, more preferably in an amount of from 3% to 10% inclusive by mass of the mass of the dry exfoliated vermiculite particles.

There may be added to the exfoliated vermiculite particles, an amount of organic or inorganic fibres, preferably ceramic, glass or carbon fibres, or synthetic, e.g polypropylene, polyethylene, acrylonitrile or polyester fibres, or natural fibres, e.g sisal, kenaf, hemp or flax fibres to provide improved internal bonding, and, where necessary, improved screw holding capability. The amount of fibres so added may be up to 2,5% by mass of the mass of exfoliated vermiculite particles.

The first step of the method of the invention is to impregnate the exfoliated vermiculite particles with the impregnating composition. This may be achieved in any suitable manner.

For example, the impregnating composition may be applied to the exfoliated vermiculite particles by a finely atomised spray in a blow line, followed, optionally, by the application of a thermosetting resin in finely divided dry powder form at a downstream position in the blow line.

Alternatively, the impregnating composition may be fed into a mixer and mixed with the exfoliated vermiculite particles, for example utilising conventional mixing equipment such as ribbon, screw or paddle blenders, followed optionally by the post application of a thermosetting resin in finely divided dry powder form.

The second step of the method of the invention is to compress the exfoliated vermiculite particles with heating in a suitable press or flat or profiled mould to allow the oil present to infuse the exfoliated vermiculite particles and to allow any resin present to polymerise to form the finished product. For example, the exfoliated vermiculite particles may be compressed and heated in a suitable press or mould at a temperature between 120° C. and 250° C. inclusive, preferably from 130° C. to 220° C. inclusive, and pressures of from 2 to 70 kg/m$^3$ inclusive.

As stated above, the third optional step of the method of the invention is to apply to the exfoliated vermiculite particles, before step (a) or preferably before step (b), a thermosetting resin in finely divided dry powder form and, if necessary, a catalyst therefor. Methods of achieving this have been described above.

The use of an impregnating composition containing a mineral oil has several advantages. Firstly, the mineral oil serves as a carrier for the liquid thermosetting resin, so that the liquid thermosetting resin may be dispersed in finely divided very small droplet form. Because the mineral oil has no volatiles, this increases the safety of the resination system, preventing escape of the droplets into the atmosphere.

In addition, very low percentages of the liquid thermosetting resin may be applied to the exfoliated vermiculite particles while still maintaining uniform and reliable distribution and without adding any water, or other solvent that may interfere with final product production when temperature and pressure are applied.

In addition, the mineral oil acts as a hydrophobic agent preventing water penetration and, in addition, preventing movement of water through the treated exfoliated vermiculite particles by capillarity.

Finally, the oil ensures that the finely divided dry powder thermosetting resin, when used, adheres firmly to the surfaces of the exfoliated vermiculite particles.

An example of the method of the invention will now be given.

EXAMPLE 1

An impregnating composition is formulated as follows:

Liquid MDI-90 g

Quendilla 19-a paraffinic oil by BP-200 g.

The liquid MDI is dispersed in the mineral oil, in the absence of a solvent.

1200 g of exfoliated vermiculite particles and 25 g of ceramic fibres are mixed and impregnated with the impregnating composition.

The exfoliated vermiculite is Mandovaal micron grade, i.e it has a mean particle size of 0,5 mm.

Thereafter there is applied to the impregnated particles 100 g of a novolac resin, viz. PRP 3337 by Polyresin Products, South Africa, which has a long flow specification. The particles of novolac resin adhere to the impregnated particles.

Thereafter, the impregnated and resinated particles are pressed to a density of 1000 kg/m$^3$, at a pressure of 28 kg/cm$^2$ and a temperature of 210° C. for a period of about 8 seconds per mm thickness.

The result is a board which may be used as a core for high pressure laminate flooring, which as a 7 day immersion in water swell of less than 0,6%, and zero movement of water of capillarity.

What is claimed is:

1. A method of manufacturing a finished product from exfoliated vermiculite particles including the steps of:

(a) impregnating the exfoliated vermiculite particles with an impregnating composition comprising:

(i) a mineral oil; and
(ii) a liquid thermosetting resin and, if necessary, a catalyst therefor; and
in the form of a dispersion of the liquid resin in the mineral oil; and
(b) compressing the exfoliated vermiculite particles with heating to allow the mineral oil to infuse the exfoliated vermiculite particles and to polymerise the thermosetting resin to form the finished product.

2. A method according to claim 1 which includes the step of:
(c) before step (a) or before step (b) applying to the exfoliated vermiculite particles a thermosetting resin in finely divided dry powder form and, if necessary, a catalyst therefor, so that the thermosetting resin in finely divided dry powder form adheres to the surfaces of the exfoliated vermiculite particles.

3. A method according to claim 1 or claim 2 wherein the liquid thermosetting resin used in step (a) is an isocyanate thermosetting resin or a precursor thereof, optionally with a catalyst therefor.

4. A method according to claim 3 wherein the thermosetting resin used in step (a) is a resin derived from diphenylmethane-4,4'-diisocyanate, optionally with a catalyst therefor.

5. A method according to claim 1 or claim 2 wherein the liquid thermosetting resin used in step (a) is an epoxy resin.

6. A method according to claim 2 wherein the thermosetting resin used in step (c) is a novolac resin.

7. A method according to claim 1 wherein the liquid thermosetting resin used in step (a) is used in an amount of from 1% to 20% inclusive by mass of the mass of the dry exfoliated vermiculite particles and the mineral oil used in step (a) is used in an amount of from 5% to 30% inclusive by mass of the mass of the dry exfoliated vermiculite particles.

8. A method according to claim 7 wherein the liquid thermosetting resin used in step (a) is used in an amount of from 2% to 10% inclusive by mass of the mass of the dry exfoliated vermiculite particles and the mineral oil used in step (a) is used in an amount of from 10% to 20% by mass of the mass of the dry exfoliated vermiculite particles.

9. A method according to claim 2 wherein the thermosetting resin in finely divided dry powder form used in step (c), is used in an amount of up to 20% inclusive by mass of the dry exfoliated vermiculite particles.

10. A method according to claim 9 wherein the thermosetting resin in finely divided dry powder form used in step (c) is used in an amount of from 3% to 10% inclusive by mass of the mass of the dry exfoliated vermiculite particles.

11. A method according to claim 1 wherein in step (a) the exfoliated vermiculite particles are impregnated with the impregnating composition by spraying or coating the impregnating composition onto the exfoliated vermiculite particles.

12. A method according to claim 1 wherein in step (a) the exfoliated vermiculite particles material are impregnated with the impregnating composition by mixing the impregnating composition with the exfoliated vermiculite particles.

13. A method according to claim 1 wherein in step (b) the exfoliated vermiculite particles are compressed and heated in a press or mould at a temperature between 120 and 250° C. inclusive and at a pressure of from 2 to 70 kg/cm$^2$ inclusive for a time of form 5 seconds to 20 seconds inclusive per mm of thickness.

14. A method of preparing exfoliated vermiculite particles for the manufacture of a finished product, including the step of:
(a) impregnating the exfoliated vermiculite particles with an impregnating composition comprising:
(i) a mineral oil; and
(ii) a liquid thermosetting resin and, if necessary a catalyst therefor;
in the form of a dispersion of the liquid resin in the mineral oil.

15. A method according to claim 14 which includes the step of:
(b) before of after step (a), applying to the exfoliated vermiculite particles a thermosetting resin in finely divided dry powder form and, if necessary, a catalyst therefor so that the thermosetting resin in finely divided dry powder form adheres to the surfaces of the exfoliated vermiculite particles.

16. A method according to claim 1 or claim 2 wherein the thermosetting resin used in step (a) is selected from the group consisting of methyl methacrylate, acrylic and methacrylic acid resins rendered thermosetting with an appropriate catalyst.

* * * * *